US006671641B1

(12) United States Patent
Collins et al.

(10) Patent No.: US 6,671,641 B1
(45) Date of Patent: Dec. 30, 2003

(54) METHOD FOR CALIBRATING HYDRAULIC ACTUATORS

(75) Inventors: Duane Zedric Collins, El Paso, TX (US); Gaspar Galindo, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 175 days.

(21) Appl. No.: 09/713,486

(22) Filed: Nov. 15, 2000

(51) Int. Cl.[7] .............................................. G01L 25/00

(52) U.S. Cl. ........................ 702/105; 702/104; 73/1.71; 73/168; 324/73.1

(58) Field of Search ................................ 702/105, 104, 702/83, 142, 96; 73/40, 1.71, 168; 324/73.1

(56) References Cited

U.S. PATENT DOCUMENTS 4,480,464 A * 11/1984 Whisenand et al. ........... 73/40
5,337,262 A * 8/1994 Luthi et al. ................ 324/73.1
5,719,790 A * 2/1998 Lohrenz et al. ............... 701/14
5,901,633 A * 5/1999 Chan et al. ................... 92/5 R

* cited by examiner

*Primary Examiner*—John Barlow
*Assistant Examiner*—Hien Vo
(74) *Attorney, Agent, or Firm*—Margaret A. Dobrowitsky

(57) ABSTRACT

A method for calibrating hydraulic actuators includes installing an actuator in a test stand and performing an electrical signal sweep to obtain a series of pressure values. Based on desired pressure values, signals yielding unwanted pressure values are removed and the remaining signal values and pressure values are stored in a central database as a look-up table for the actuator. Multiple actuators are then assembled to form a module assembly. The customized look-up tables for the actuators forming the module assembly are retrieved from the database. Based on those tables, signals are applied to the actuators to determine if the pressure values fall within specified tolerance windows. If the pressure values fall within the specified tolerance windows, the customized look-up tables are stored in the memory of a vehicle electronics package. If not, the signals are adjusted so that the pressure values fall within the specified windows, and the adjusted customized look-up tables are then stored in the memory.

9 Claims, 3 Drawing Sheets

METHOD FOR CALIBRATING HYDRAULIC ACTUATORS

TECHNICAL FIELD

The present invention relates generally to vehicle hydraulic fluid management systems.

BACKGROUND OF THE INVENTION

Modern motor vehicles are equipped with numerous fluid based systems, e.g., anti-lock brake systems, ride control systems, or traction control systems, that provide comfort and safety to drivers and passengers of these vehicles. Each of these systems require numerous hydraulic actuators that direct the flow of hydraulic fluid between the system components when necessary. For example, a typical anti-lock brake system can include several hydraulic actuators to control the fluid pressure in the individual components, e.g., a master cylinder, and a plurality of wheel cylinders.

The memory of an actuator control system includes numerous look-up tables which allow the control system to know what electric signals, e.g., current values, to apply to the actuators in order to yield specific actuation pressures. Typically, these look-up tables are generic tables that are not tailored to the individual actuators in the fluid system. These generic tables are created to account for worst-case part-to-part variances, manufacturing variances, and system variances. Thus, the tolerances of the values contained in the tables are relatively large and result in less than optimal performance of the actuators.

As recognized by the present invention, very expensive actuators can be used to decrease part-to-part variances, but the overall system tolerances remain larger than the tolerances that can be obtained by individually calibrating less expensive actuators to create customized look-up tables for each actuator.

The present invention has recognized the prior art drawbacks, and has provided the below-disclosed solutions to one or more of the prior art deficiencies.

SUMMARY OF THE INVENTION

A method for calibrating a hydraulic actuator includes applying a series of electrical signals to the actuator. For each applied electrical signal, the actuation pressure of the actuator is measured. Then, based on predetermined pressure values, unwanted signals are filtered out to create a customized look-up table for the actuator.

In a preferred embodiment, the customized look-up table is stored in a database. Preferably, multiple actuators are assembled to form a module assembly and the customized look-up table for each actuator is accessed. Based on the customized look-up tables, electrical signals are applied to each actuator and an actuation pressure is measured for each electrical signal. Based on the measured actuation pressures, the customized look-up tables are adjusted and then, the adjusted customized look-up tables are stored in a database. In a preferred embodiment, the electrical signals include a current sweep from a minimum value to a maximum value back to the minimum value. In another aspect of the present invention, the electrical signals include a voltage duty cycle sweep from a minimum value to a maximum value back to the minimum value.

In yet another aspect of the present invention, an actuator device test system includes a test stand. An actuator device is installed in the test stand. In this aspect of the present invention, the test stand includes a control circuit that includes logic means for creating a customized look-up table for the actuator device.

In still another aspect of the present invention, an actuator module assembly is calibrated. Initially, a customized look-up table is established for each hydraulic actuator in the actuator module assembly. Then, the actuators are assembled to form the module assembly. Thereafter, signals are applied to each actuator. Based on the responses of the actuators to the signals, an adjusted customized look-up table is established for each actuator.

The present invention will now be described, by way of example, with reference to the accompanying drawings, in which:

DESCRIPTION OF AN EMBODIMENT OF THE INVENTION

Figure 1:
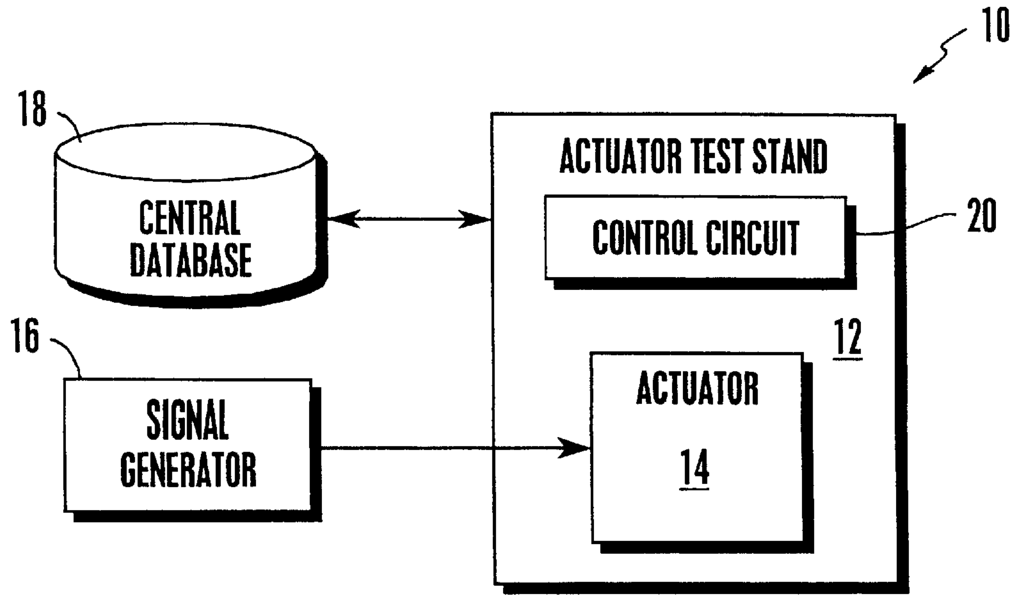
FIG. 1 is a block diagram of an actuator test system.

Referring initially to FIG. 1, an actuator test system is shown and generally designated 10. As shown in FIG. 1, the actuator test system 10 includes an actuator test stand 12 having an actuator 14 placed therein. It is to be appreciated that the actuator 14 is, e.g., a PWM actuator, a variable bleed actuator, or a variable force actuator, used in a hydraulic management system. When placed in the actuator test stand 12, the actuator 14 is connected to a signal generator 16 that provides a current or voltage signal to the actuator 14 during the actuator calibration process described below. As shown in FIG. 1, the actuator test stand 12 is connected to a central database 18 in which look-up tables generated during the calibration process are stored. FIG. 1 also shows that the actuator test stand 12 includes a first control circuit 20 that undertakes the actuator calibration logic described below.

Figure 2:
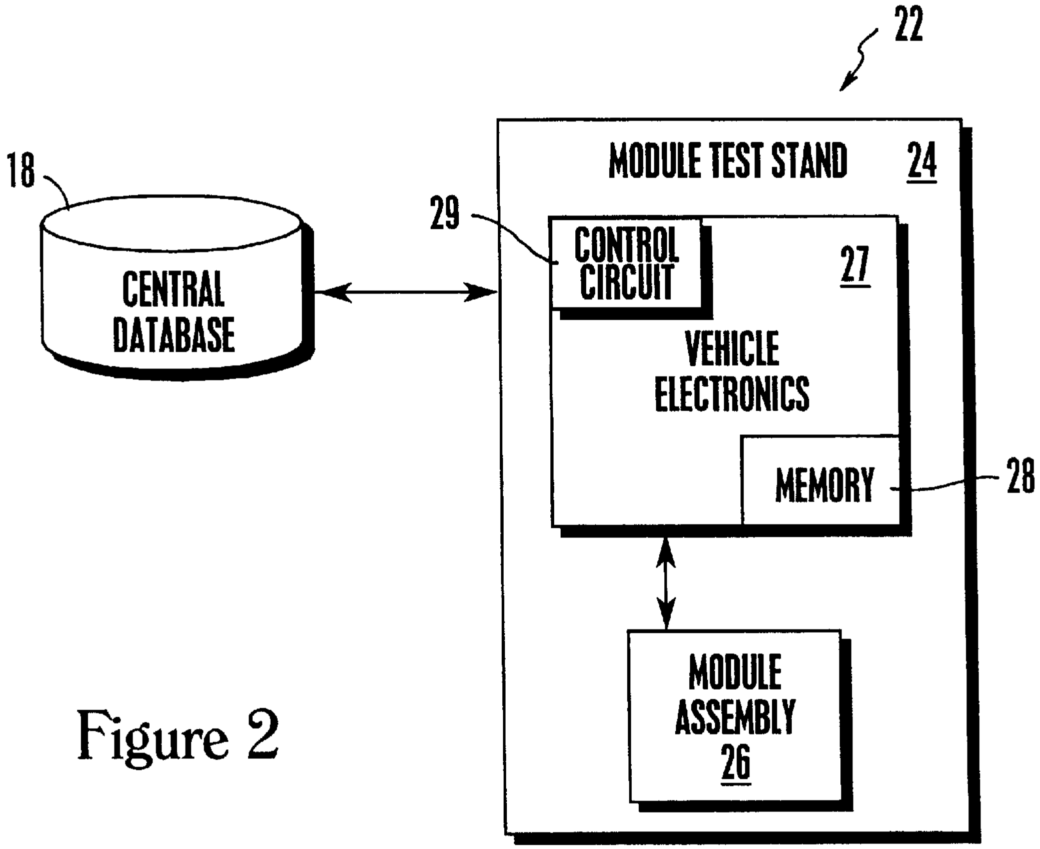
FIG. 2 is a block diagram of a module assembly test system.

FIG. 2 shows a module assembly test system generally designated 22. As shown in FIG. 2, the module assembly test system 10 includes a module test stand 24 and a module assembly 26, consisting of multiple actuators 12, disposed therein. When placed in the module test stand 24, the module assembly 26 is connected to a vehicle electronics package 27 that provides current or voltage signals to the module assembly 26 during the module calibration process described below. The vehicle electronics 27 also includes a memory 28 and a second control circuit 29. As shown in FIG. 2, the module test stand 24 is connected to the central database 18. Accordingly, as described below, the look-up tables generated during the actuator 12 calibration process are retrieved from the central database 18 and temporarily stored in the vehicle electronics 27. Thereafter, the look-up tables may be adjusted before being permanently stored in the vehicle electronics 27. It is to be understood that the second control circuit 29 that executes the module assembly calibration logic described below.

The method for calibrating hydraulic actuators 12, disclosed below, may be executed as a series of instructions by a digital processor on the actuator test stand 12 and the module test stand 24. These instructions may reside, for example, in the control circuits 20, 29 of the test stand 12 and vehicle electronics 27, which, when programmed with the present logic, establishes a computer program product.

Alternatively, the instructions may be contained on a data storage device with a computer readable medium, such as a computer diskette having a data storage medium holding computer program code elements. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code and/or micro-code. As yet another equivalent alternative, the logic can be embedded in an application specific integrated circuit (ASIC) chip or other electronic circuitry.

Figure 3:
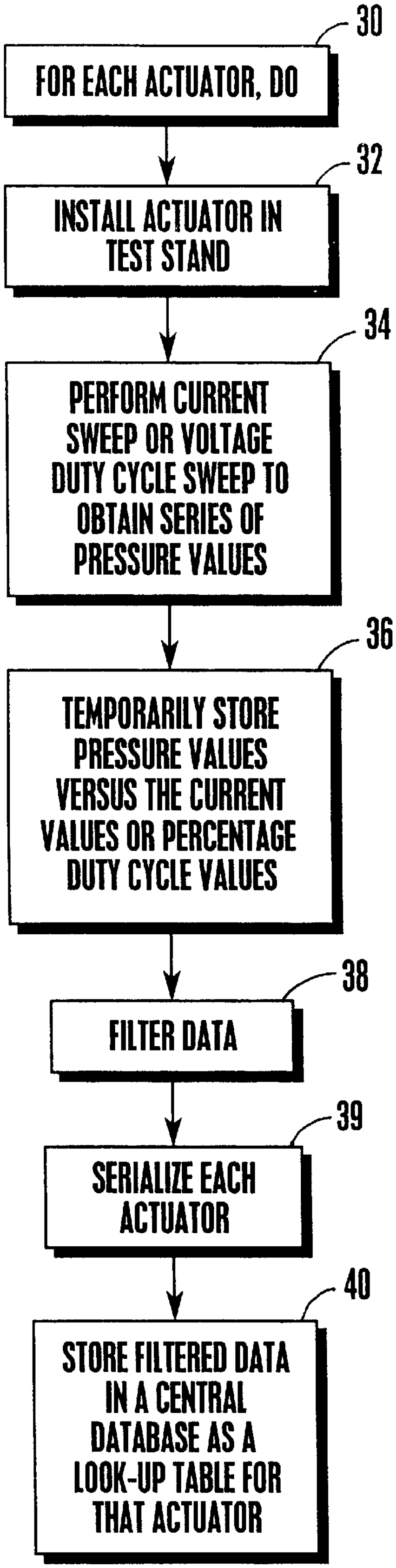
FIG. 3 is a flow chart showing the actuator calibration logic.

Referring now to FIG. 3, the individual actuator calibration logic is shown. Commencing at block 30, a do loop is entered wherein the succeeding steps are completed for each actuator 14. Moving to block 32, the actuator 14 is installed in the actuator test stand 12. Thereafter, at block 34 a current sweep or voltage duty cycle sweep is performed on the actuator 14 by applying a series of signals to the actuator 14 from the signal generator 16. The current sweep preferably is performed from zero amps to one amp back to zero amps (0A–1A–0A) and the voltage duty cycle sweep preferably is performed from zero percent to one hundred percent back to zero percent (0%–100%–0%). It is to be appreciated that either signal sweep is performed in increments small enough to obtain a satisfactory resolution.

Continuing the description of the actuator calibration logic, at block 36 the pressure values obtained during either sweep, or both sweeps, are temporarily stored in the memory of the actuator test stand 12. Proceeding to block 38, this data is filtered in order to obtain the exact current values or percentage duty cycle values which, when applied to the actuator 14, yield the sought after pressure values. In other words, during the current sweep performed at block 34, a series of pressure values are obtained, as shown in Table 1. Thereafter, to meet predetermined requirements it is necessary to remove any current values which do not correspond to the desired pressure values, shown in Table 2. Thus, only the current values which correspond to the desired pressure values remain, as shown in Table 3.

TABLE 1

Exemplary Current Values vs. Pressure Values (0.0 A to 0.40 A)

| Current (A) | Pressure (psi) |
|---|---|
| 0.000 | 93.33 |
| 0.025 | 93.15 |
| 0.050 | 92.97 |
| 0.075 | 92.63 |
| 0.100 | 92.09 |
| 0.125 | 91.76 |
| 0.150 | 91.28 |
| 0.175 | 90.97 |
| 0.200 | 90.49 |
| 0.225 | 90.01 |
| 0.250 | 89.10 |
| 0.275 | 88.45 |
| 0.300 | 88.12 |
| 0.325 | 87.91 |
| 0.350 | 87.12 |
| 0.375 | 86.99 |
| 0.400 | 84.88 |

TABLE 2

| Exemplary Desired Pressure Values Pressure (psi) |
|---|
| 93.0 +/− 0.1 |
| 92.0 +/− 0.1 |
| 91.0 +/− 0.1 |
| 90.0 +/− 0.1 |
| 89.0 +/− 0.1 |
| 88.0 +/− 0.1 |
| 87.0 +/− 0 1 |

TABLE 3

Exemplary Filtered Look-up Table

| Pressure (psi) | Current (Amp) |
|---|---|
| 93.0 +/− 0.1 | 0.050 |
| 92.0 +/− 0.1 | 0.100 |
| 91.0 +/− 0.1 | 0.175 |
| 90.0 +/− 0.1 | 0.225 |
| 89.0 +/− 0.1 | 0.250 |
| 88.0 +/− 0.1 | 0.325 |
| 87.0 +/− 0.1 | 0.375 |

Returning to the actuator calibration logic shown in FIG. 3, at block 39 each actuator is serialized, i.e., each actuator is assigned a serial number that allows each actuator to be identified later. Thereafter, at block 40 the filtered data, e.g., the data shown in Table 3, is stored in the central database 18 as a customized look-up table for that particular actuator 14. Each look-up table stored in the central database 18 is linked to the serial number of its corresponding actuator 12. The customized look-up table for each actuator 14 is then retrieved at the module test stand during the module assembly calibration logic described below. It is to be appreciated that by filtering the data, a graph of the pressure values versus the current values, or percentage duty cycle values, can be made to take nearly any shape, e.g. curved, dual-slope, flat, and linear.

Figure 4:
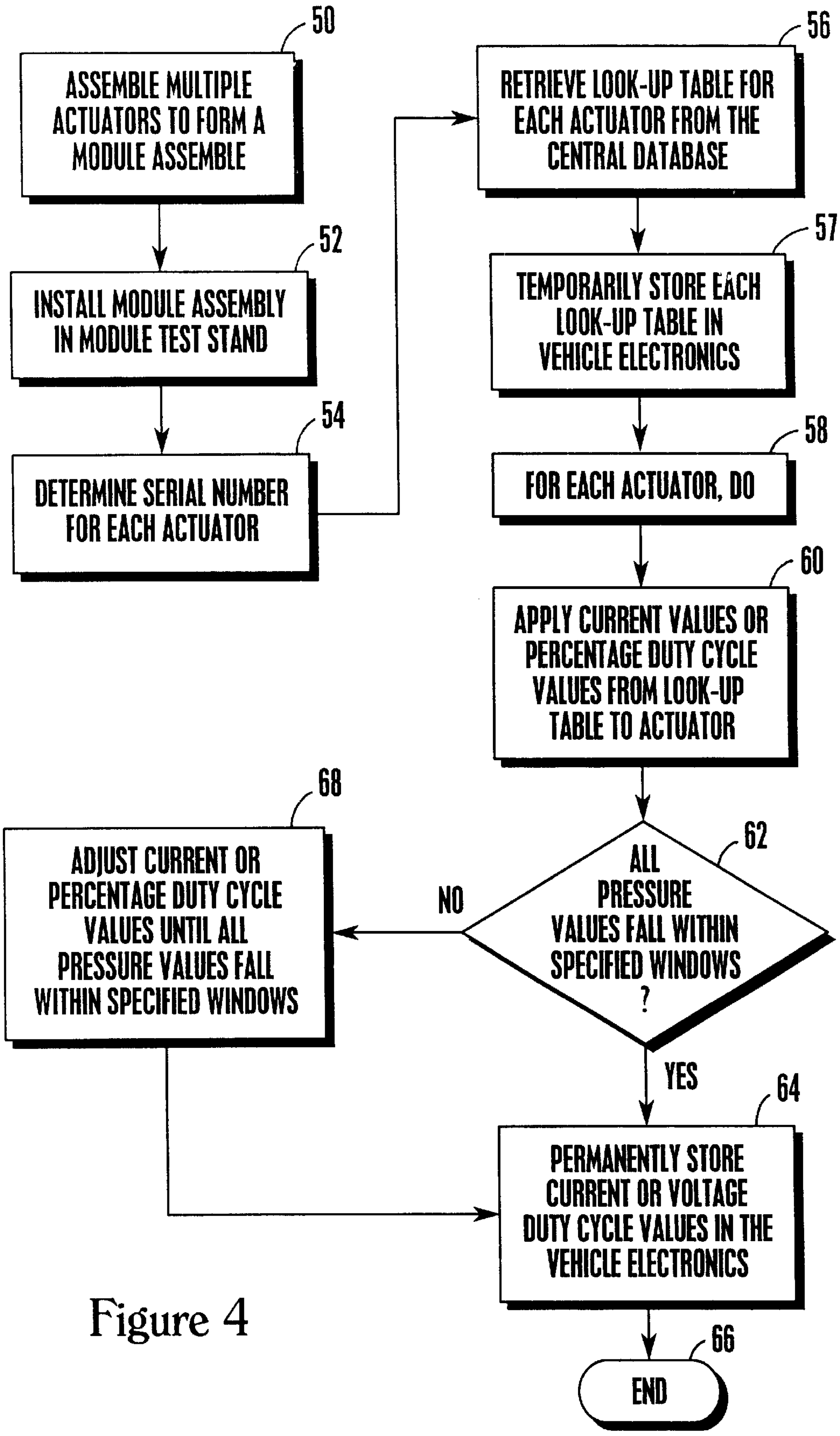
FIG. 4 is a flow chart showing the module assembly calibration logic.

Referring now to FIG. 4, the module assembly calibration logic is shown, and commencing at block 50 multiple actuators 12 are assembled to form a module assembly 26. At block 52, the module assembly 26 is installed in a module test stand 24. Moving to block 54, the serial number for each individual actuator 12 is determined. Thereafter, at block 56, the customized look-up table for each actuator 14 is retrieved from the central database 18, based on the serial numbers determined at block 52. At block 57, each look-up table is temporarily stored in the vehicle electronics 27, e.g., in the memory 28.

Continuing to block 58, a do loop is entered wherein for each actuator 14 comprising the module assembly 26 the succeeding steps are performed. At block 60, the current values or percentage duty cycle values from the look-up table are applied to the module assembly 20 by the vehicle electronics 27. Moving to decision diamond 62, it is determined whether the pressure values for each actuator 14 fall within the predetermined tolerance windows, e.g., plus or minus one-tenth pound per square inch (+/−0.1 psi). If so, the logic ends proceeds to block 64 where the current or voltage duty cycle values are permanently stored in the vehicle electronics 27, e.g., in the memory 28. Thereafter, the logic ends at state 66.

If at decision diamond 62, if the pressure values do not fall within the predetermined windows the logic proceeds to block 68 where the current or percentage duty cycle applied to the actuator 14 is adjusted so that the pressure values fall within the specified windows. Then, at block 64 the adjusted current values or percentage duty cycle values are permanently stored in the vehicle electronics 27. The logic then ends at state 66.

With the configuration of structure and logic described above, it is to be appreciated that the method for calibrating hydraulic actuators can be used create customized look-up tables for hydraulic actuators. When the actuators are assembled to form module assemblies, the customized look-up tables can be used to further create adjusted customized look-up tables depending on the response of the module assemblies to signals from the vehicle electronics. Either the customized look-up tables or the adjusted customized look-up tables are stored in the vehicle electronics memory. Thus, the tolerances of the module assemblies are reduced and their performance is increased.

While the particular METHOD FOR CALIBRATING HYDRAULIC ACTUATORS as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A method for calibrating at least one hydraulic actuator, comprising the acts of:

applying a series of electrical signals to the actuator;

measuring an actuator pressure for each applied electrical signal;

filtering out unwanted signals based on predetermined pressure values to create a customized look-up table for the actuator; wherein the electrical signals comprise at least one of: a current sweep from a minimum value to a maximum value back to the minimum value, and a voltage duty cycle sweep from a minimum value to a maximum value back to the minimum value.

2. The method of claim 1, further comprising the acts of:

assembling multiple actuators to form a module assembly; and accessing the customized look-up table for each actuator.

3. The method of claim 2, further comprising the acts of:

based on the customized look-up tables, applying electrical signals to each actuator;

measuring an actuation pressure for each applied electrical signal; and adjusting the customized look-up tables at least partially based on the measuring act.

4. The method of claim 3, further comprising the act of:

storing at least one adjusted customized look-up table in a vehicle electronics memory.

5. An actuator device test system, comprising:

a test stand;

at least one actuator device installed in the test stand; and a control circuit within the test stand, the control circuit creating a customized look-up table for the actuator device, the control circuit including:

logic means for applying a series of electrical signals to the actuator device;

logic means for measuring an actuation pressure for each applied electrical signal; and logic means for filtering out unwanted signals based on predetermined pressure values to create a customized look-up table for the actuator device.

6. The system of claim 5, further comprising:

logic means for storing the customized look-up table in a database.

7. The system of claim 6, further comprising:

logic means for downloading the customized look-up table for each actuator of a module assembly.

8. The system of claim 7 further comprising:

logic means for applying electrical signals to each actuator based on the customized look-up tables;

logic means for measuring an actuation pressure for each applied electrical signal; and logic means for adjusting the customized look-up tables at least partially based on the means for measuring.

9. The system of claim 8, further comprising:

logic means for storing at least one adjusted customized look-up tables in a vehicle electronics memory.

* * * * *